United States Patent
Hayashi et al.

(10) Patent No.: US 9,106,940 B2
(45) Date of Patent: *Aug. 11, 2015

(54) METHODS AND APPARATUS FOR CUSTOMIZING VIDEO SERVICES PROVIDED TO CUSTOMERS IN HOTELS

(75) Inventors: Michael Hayashi, Evergreen, CO (US); Kenneth Gould, Reston, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/238,986

(22) Filed: Sep. 21, 2011

(65) Prior Publication Data
US 2013/0074106 A1 Mar. 21, 2013

Related U.S. Application Data

(60) Provisional application No. 61/536,143, filed on Sep. 19, 2011.

(51) Int. Cl.
*H04N 7/18* (2006.01)
*G06F 7/04* (2006.01)
(Continued)

(52) U.S. Cl.
CPC ......... *H04N 21/25891* (2013.01); *G06Q 30/02* (2013.01); *H04N 7/165* (2013.01); *H04N 21/2143* (2013.01); *H04N 21/25816* (2013.01); *H04N 21/25866* (2013.01); *H04N 21/25875* (2013.01); *H04N 21/25883* (2013.01); *H04N 21/2668* (2013.01); *H04N 21/44222* (2013.01);
(Continued)

(58) Field of Classification Search
CPC ................... H04N 21/2143; H04N 21/25875; H04N 21/4532; H04N 21/25891; H04N 21/47211; H04N 21/482; H04N 7/165; H04N 21/25866; H04N 21/2668; H04N 21/44222; H04N 21/4542; H04N 21/25816; G06Q 30/02
USPC ........... 725/34, 35, 36, 46, 56, 135, 23, 62, 1, 725/78, 87, 91–93, 100–101, 103–104, 725/114–116, 131, 139, 144–146, 151; 705/14.1–14.14, 14, 27, 14.31–14.36; 726/7, 29
See application file for complete search history.

(56) References Cited

U.S. PATENT DOCUMENTS 5,001,554 A * 3/1991 Johnson et al. ................ 725/8
5,477,262 A * 12/1995 Banker et al. ................ 725/38

(Continued)

*Primary Examiner* — Hoang-Vu A Nguyen-Ba
(74) *Attorney, Agent, or Firm* — Straub & Pokotylo; Michael P. Straub; Stephen T. Straub

(57) ABSTRACT

Methods and apparatus facilitating sharing of customer information known to a video service provider which services a customer's home, with a hotel chain at which the customer is staying as a guest, are described. Disclosure of information about the customer's home service may, and in some embodiments is, limited to information directly related to providing the customer personalized video service. Information known about a guest by the guest's home video service provider is extended to the hotel by allowing that guest's home channel-watching preferences to be retrieved and stored within the hotel system. Based on the information retrieved from the cable operator or other service provider, when a guest is checked into a room, the STB (or other video-delivery/rendering device) used at the hotel is customized so that, channels are made available on the TV for channel surfing in the manner normally seen at the guest's home.

20 Claims, 8 Drawing Sheets

(51) Int. Cl.
  *H04N 21/258* (2011.01)
  *H04N 21/442* (2011.01)
  *H04N 21/454* (2011.01)
  *H04N 21/472* (2011.01)
  *H04N 21/482* (2011.01)
  *H04N 21/214* (2011.01)
  *H04N 21/2668* (2011.01)
  *G06Q 30/02* (2012.01)
  *H04N 7/173* (2011.01)
  *H04N 7/16* (2011.01)

(52) U.S. Cl.
  CPC ......... *H04N 21/454* (2013.01); *H04N 21/4542* (2013.01); *H04N 21/47211* (2013.01); *H04N 21/482* (2013.01)

(56) References Cited

U.S. PATENT DOCUMENTS

| | | | | |
|---|---|---|---|---|
| 2002/0174430 | A1* | 11/2002 | Ellis et al. | 725/46 |
| 2005/0091686 | A1* | 4/2005 | Sezan et al. | 725/46 |
| 2008/0256570 | A1* | 10/2008 | Tenbarge et al. | 725/28 |
| 2009/0006418 | A1* | 1/2009 | O'Malley | 707/10 |
| 2009/0144361 | A1* | 6/2009 | Nobakht et al. | 709/203 |
| 2009/0256718 | A1* | 10/2009 | Lockett et al. | 340/825.24 |
| 2011/0099590 | A1* | 4/2011 | Kim et al. | 725/81 |
| 2011/0197232 | A1* | 8/2011 | Sekiguchi | 725/44 |
| 2011/0302607 | A1* | 12/2011 | Warrick et al. | 725/39 |
| 2011/0314502 | A1* | 12/2011 | Levy et al. | 725/46 |
| 2013/0024884 | A1* | 1/2013 | Agnihotri et al. | 725/25 |

* cited by examiner

METHODS AND APPARATUS FOR CUSTOMIZING VIDEO SERVICES PROVIDED TO CUSTOMERS IN HOTELS

RELATED APPLICATIONS

The present application claims the benefit of U.S. Provisional Patent Application Ser. No. 61/536,143 filed Sep. 19, 2011 which has the same title as the present application and which is hereby expressly incorporated by reference in its entirety.

FIELD OF INVENTION

The invention relates to methods and apparatus for providing video service information and, more particularly, to methods and apparatus for providing information which can be used to customize video services provided to a customer, e.g., staying at a hotel, to make a video service at the hotel similar to the service received by the customer at home.

BACKGROUND

Currently, hotel chains offer hotel patrons "frequent guest programs", where these guest programs offer patrons rewards for staying at hotels managed by a hotel administration group. These hotel chains may even maintain dossiers on patron preferences such as which newspaper the customer prefers or even information on the patron's birthday or wedding anniversary dates in an attempt to personalize the interactions with the patron. At some hotels, guest information is displayed on the TV in the room in which the patron is staying with an announcement saying "Welcome to our hotel, Mr. Smith, our valued guest."

Hotel chains are attempting to differentiate themselves by offering larger video channel lineups in order to appeal to frequent guests' varied tastes in video programming. As a result, the in-hotel video-watching experience is both enticing and frustrating at the same time; guests are happy that their varied tastes are being catered to, but at the same time, the guest is forced to channel surf through more channels about which they do not care, but which are made available to appeal to other guests' varied tastes.

It would be desirable if hotels could find ways of providing improved video customization features without requiring the hotel to solicit and then maintain the video customization preference information from its customers. It would also be desirable if, at least in some embodiments, methods and apparatus could be developed for providing customers with access to premium channels based on subscriptions which they have at home.

SUMMARY

Methods and apparatus of the present invention facilitate sharing of customer information known to a video service provider which services a customer's home, with a hotel chain at which the customer is staying as a guest. Disclosure of information about the customer's home service may, and in some embodiments is, limited to information directly related to providing the customer personalized video service, e.g., for the time period in which he or she is staying as a guest at a hotel.

The methods and apparatus of the present invention extend the information known about a guest by allowing that guest's home channel-watching preferences to be retrieved and stored within the hotel system. Based on the information retrieved from the cable operator or other service provider providing a video service to the guest's home residence, when a guest is checked into a room, the STB (or other video-delivery/-rendering device) used at the hotel is customized so that, at least in some embodiments, the order of channels that are made available on the TV for channel surfing is in the manner normally seen at the guest's home. In addition, the order that channels appear in the on-screen electronic program guide is presented in a manner which is the same or similar to what is shown on the user's home program guide.

In some embodiments, parental control information and/or channel blocking information is obtained from the service provider servicing the guest's home and the information is used by the hotel system so that undesirable channels, as determined based on information corresponding to the user's home residence, neither appear while channel surfing nor within the program guide displayed in the guest's room during the stay at the hotel.

The guest's preferences, configured from home and indicated to the video service provider servicing the user's home, can, and in some embodiments does, also indicate whether the video-on-demand (for pay content) is automatically disabled when the guest checks in singly or with children. In some embodiments such information is used to automatically disable/enable pay per view and/or access to adult channels while the guest is staying in the hotel based on check in information supplied by the guest and/or entered into the hotel system by a hotel clerk.

In some embodiments, information about the customer is stored in a Customer Profile Datastore (CPD), e.g., at a network headend used to provide video service to a customer's home residence. Often the video channels made available to a hotel are delivered by a Multi-Service Operator (MSO) such as a cable network operator that provides multiple services and operates multiple systems. The MSO maintains cable customer data, e.g., cable customer data, including billing information, email addresses and other forms of customer identification information. The MSO-based customer data may also include video-watching preferences that can, and in some embodiments is, used to generate the video watching profile to be used when the MSO customer is a patron of a hotel.

When the customer becomes a guest of a hotel, the hotel can use the guests "MSO identity" or some other guest identifier such as a hotel frequent rewards program member identifier to request the guest's video watching preferences from a CPD maintained by the MSO, e.g., at a network headend. Thus, the hotel patron can have a unique identifier used by the guest at the hotel (such as a hotel loyalty card identifier (ID) number) which has been "federated" with the MSO's CDP such that the loyalty card id has been used by the MSO as a customer's unique ID.

Alternatively, in some embodiments, the CPD is maintained by the hotel or $3^{rd}$ party instead of being maintained by the MSO e.g., at a network headend. The CDP also allows the federation of customer identities between hotel chains. That is, the same customer database can be used to supply information to different hotel chains allowing a customer to have his video preferences supplied to different hotel chains at which he/she may stay.

When the guest checks into the hotel, the hotel's system, e.g., hotel video system and/or hotel management system, retrieves all or a portion of the guest's viewing profile which includes information regarding video services and customers viewing preferences, from the CDP and the information is then used to control the hotel's video system. The retrieval may involve sending a message requesting customer information from the CPD. The hotel's video system, in some embodiments, generates a unique electronic program guide (EPG) for the guest based on the retrieved information. The EPG is delivered to the video-rendering device, e.g., STB, in the guest's hotel room when that device is activated. The format of the EPG can be implemented using well-known mechanisms such as HTML, Javascript, Adobe Flash. The EPG can represent the channels available for viewing as a list and/or a series of screens containing "mosaics" of video channels that can be viewed simultaneously.

The ability to generate a unique ordering of channels for channel surfing purposes, based on the information included in a customer profile, is also possible and implemented in some embodiments, whether the rendering device receives a channel via QAM tuning or by joining an IP video stream, as the navigational aid simply tunes to a specific known frequency or joins a specific known IP address each time the "Channel up/channel down" buttons are pressed on the remote control.

Various features offer advantages over other systems in that at least some embodiments combine a hotel guest loyalty program's guest identity with video viewing preferences, customized video channel lineup, customized video navigational aids, and/or automated parental controls based on information corresponding to a guests home video system and/or service provider. Likewise, various features introduce the concept of identity federation between hotels and MSOs, and from one hotel chain to another.

Numerous additional features and embodiments are discussed in the detailed description which follows.

DETAILED DESCRIPTION

Figure 1:
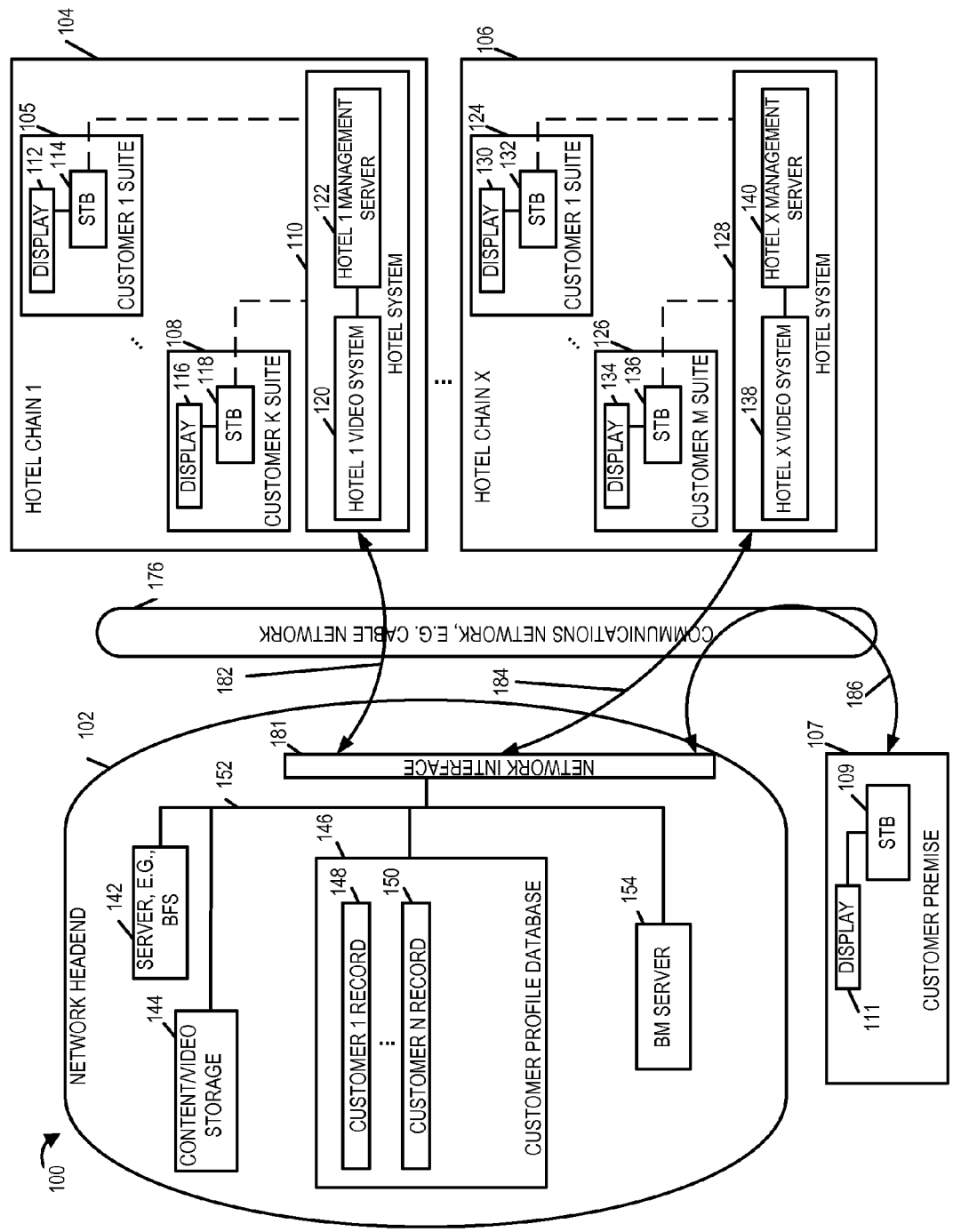
FIG. 1 illustrates an exemplary system implemented in accordance with the present invention.

FIG. 1 illustrates a system 100 implemented in accordance with one exemplary embodiment of the present invention. The system 100 shown in FIG. 1 supports delivery of content, e.g., video and audio content, and/or other information, between various devices, e.g., set top boxes, video systems/servers, etc. The system 100 includes a network headend 102, a communications network 176, e.g., a cable network, one or more customer premises including customer premise 107, in addition to a plurality of hotel chains including hotel chain 1 104 through hotel chain X 106.

The network headend 102 may be implemented at a cable network office or site including multiple servers and databases which are coupled together. In the FIG. 1 example, the headend 102 includes a server 142, e.g., a broadcast file server (BFS), content storage 144, a customer profile database 146, and a business management server 154. The various servers and other components included in the headend 102 are coupled together by a local network 152. The local network 152 is coupled via one or more network interfaces 181 to other networks and/or devices. For example, the headend 102 is coupled via network interface 181 to communications network 176, e.g., a cable network, to the hotel chains 106, 106, and to the customer premise 107.

Via cable network 176, the devices in the network headend 102 can send video and audio content, programming related information, and/or other information to set top boxes and/or computers located at the customer premise 107, and to the hotel video systems located in the hotel chains 104, 106.

The customer premise 107 includes a set top box 109 and a display device 111, which could be, e.g., external television. As shown in FIG. 1, communications link 186 traversing the service provider's cable network 176 couples STB 109 to the network head end 102's network interface 181. Customer premise 107 may include additional STBs and display devices. Although one customer premise 107 is shown, it should be appreciated that system 100 may include a plurality of customer premises which receive services from the service provider's headend 102.

The Hotel chains, e.g., hotel chain 1 104 and hotel chain X 106 are hotels corresponding to some national or international hotel chain. Hotel chains 104, 106 each include a plurality of rooms/suites referred to as a customer/guest suite which can be rented by a customer. Hotel chain 1 104 includes customer suit 1 105 through customer suit K 108 while hotel chain X 106 includes customer suit 1 124 through customer suit M 126. In some embodiments each hotel chain includes a hotel system, such as the hotel system 110 in hotel chain 1 104 and hotel system 128 in hotel chain 106. Hotel system 110 includes hotel 1 video system 120 and hotel 1 management server 122 while hotel system 128 includes hotel X video system 138 and hotel X management server 140. As shown in FIG. 1, communications link 182 traversing the service provider's cable network 176 couples hotel chain 104's system 110 to the network head end 102's network interface 181. Similarly, hotel chain 106's system 128 is coupled to the network head 102's network interface 181 via link 184 which traverses service provider cable network 176.

In some embodiments each customer suite located in the hotel chains 104 through 106, includes a set top box and a display device, e.g., TV. For example, hotel chain 1 104 includes STBs 114, 118 coupled to respective display devices 112, 116 in customer suites 105, 108 respectively, while hotel chain 2 106 includes STBs 132, 136 which are coupled to respective display devices 130, 134 in customer suites 124, 126 respectively. The set top box devices 114, 118 are coupled to the hotel system 110 and the set top box devices 132, 136 are coupled to the hotel system 128. The hotel systems 110, 128 are used to interact with and/or to send/receive information, e.g., programming content, customer related video service information and/or other information, from the network headend 102.

It should be appreciated that each of the STBs 109, 114, 118, 132, and 136 can be integrated in a device which also includes a display. The STBs support video and, optionally, E-mail functionality. The STBs in the hotels chains, e.g., 114, 118, and 132, 136 can be used to interact with and/or send information to hotel systems 110, 128, in addition to receiving content, and other programming content and/or information from the hotel systems 110, 128. The STB 109 located at the customer premise can be used to interact with and/or send information to the network headend 102 in addition to receiving content, and other programming content and/or information from the headend 102. The STBs 109, 114, 118, 132, and 136 may, and often do, include DVR functionality and the storage of user selected content.

The BFS 142, among other things, is responsible for broadcasting programming content and/or other information to one or more customer devices such as the STB 109 located at the customer premise 107 and to hotel systems 110, 128 located at the hotel chains 104, 106 respectively.

In various embodiments the programming content, e.g., movies, regional favorites, on-demand content etc., is stored in the headend 102, e.g., in the content/video storage 144.

Customer profile database 146 includes customer profile records 148 through 150. In some embodiments, each customer profile records correspond to a hotel guest program membership identifier. In various embodiments the stored customer profile records 148 through 150, include customer information including, e.g., customer identification information, customer subscription information. In addition to the customer profile records the database may include customer account information, customer device capability information corresponding to the devices used by a customer at a customer premise, e.g., customer's home, and other billing related information.

BM (Business management) server 154 processes billing information corresponding to customers serviced by the network headend 102. In addition, the BM server 154 interacts and exchanges information with the various hotel systems such as hotel system 110, 128 and upon receiving signaling, e.g., a request for video service message from the hotels systems 110, 128, sends at least some video service information relevant to customers for which it is requested. The video service information can then be used by the hotel systems 110, 128 to provide improved video service, e.g., programming content, to customers staying in the hotel for which the video service information was requested.

Processes billing information may include updating billing charge information in response to changes in the set top box being supplied, video on demand purchases, and/or other activity. Business management server 154 also processes bill payment information, e.g., credit card transactions, deductions from debit accounts, mail bills, and/or processes discount and/or coupon information.

In accordance with one aspect of the invention, in some embodiments a hotel video system, e.g., hotel system 110, at a hotel chain provides a user/customer that is staying at the hotel chain, the same or similar program content viewing experience which the customer gets at his/her home, e.g., a customer staying at the hotel is able to view customized program guide which the customer uses at his/her home, the customer is able to access the same premium channels, pay per view content which the customer is entitled to when the customer is at home.

Figure 2:
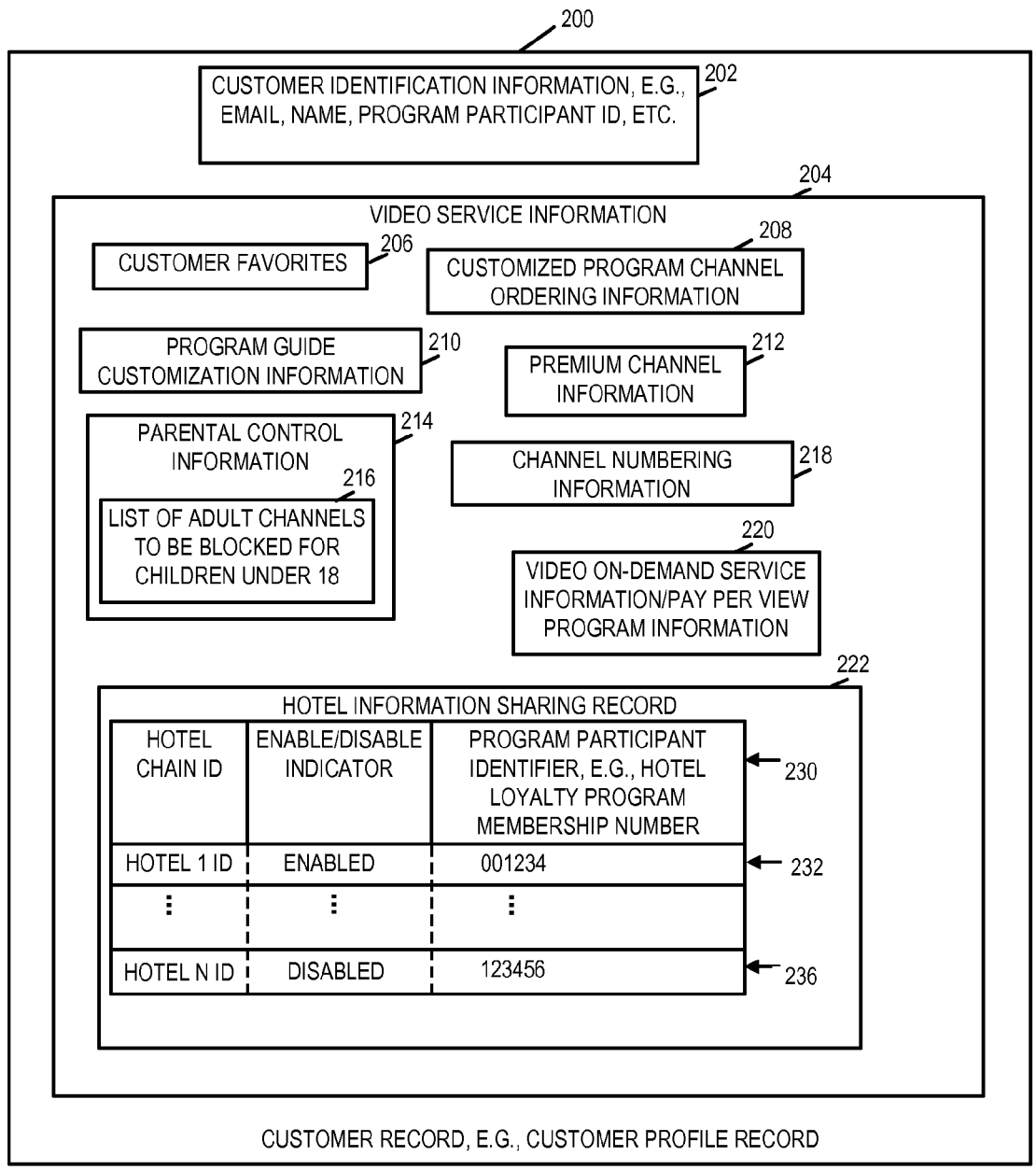
FIG. 2 is a drawing of an exemplary customer record stored in a customer profile database in accordance with one exemplary embodiment implemented.

FIG. 2 illustrates an exemplary customer profile record 200 which may be, and in some embodiments is, stored in the customer profile database shown in FIG. 1. The exemplary customer profile record 200 includes a plurality of sets of customer related information including customer identification information 202 and video service information 204.

The customer identification information 202 includes at least one of: a customer name, an email address corresponding to the customer, a program participant identifier corresponding to the customer, a multi system operator (MSO) customer identifier used by an MSO, e.g., service provider system such as headend 102, to identify the customer. A program participant identifier is, e.g., a membership identification number, which is given to a customer by a hotel chain and/or other service provider. In some embodiments the program participant identifier is a loyalty program membership number. Such a program participant identifier may be issued by a service provider, e.g., hotel chains 104, 106, to their valued customers, for example, who frequently stays at the hotel chain.

The video service information 204 includes at least one of: customized program channel ordering information; ii) channel numbering information indicating channel numbers used to provide a video service to a residence corresponding to the customer; iii) program guide customization information; iv) premium channel information indicating premium channels to which the identified customer subscribes and v) parental control information. In the illustrated embodiments the video service information 204 includes customer favorites 206, customized program channel ordering information 208, program guide customization information 210, premium channel information 212, parental control information 214, channel numbering information 218, video on-demand service information/pay per view program information 220, and hotel information sharing record 222.

Customer favorites 206 includes customer's favorite movies, TV shows, music videos and or other content. Customized program channel ordering information 208 includes information regarding the order in which the customer has arranged or customized various program channels for viewing at the customer's premise, e.g., home. For example the customer may customize the channel lineup such that various news channels are given numbers from channel 1 to channel 5, followed by sports channels which may be appear from channel 6 to channel 12. Program guide customization information 210 includes information regarding the settings applied to the program guide, e.g., program menu, by the customer so that the program guide appears to the customer in a manner desired by the customer. By customizing the program guide /program menu, the customer may wish to block certain channels from appearing in the program guide.

Parental control information 214 includes information indicating which channels are to be blocked from display and/or listing in the program guide, e.g., when the program guide is being displayed to a child. The parental control information 214 includes list 216 of adult channels to be blocked for children under 18 years of age.

Channel numbering information 218 includes information regarding channel numbers used to provide a video service to a residence corresponding to the customer. For example, channel numbering information 218 indicates that CNN is provided on channel number 200, HBO is provided on channel 245, ESPN is provided on channel 300 to the residence corresponding to the customer. Video on-demand service information/pay per view program information 220 includes information indicating the on-demand content to which the customer has access and for what period of time, and/or the pay per view events which should be accessible to the customer, e.g., due to he customer's package plan which may include access to one or more pay per view events, or due to customer's ordering of such pay per view content.

Hotel information sharing record 222 includes information associating the customer with one or more hotel chains and the customer's settings whether at least some of the video service information 204 should be shared with one or more hotel chains requesting the video service information from the headend 102. The hotel information sharing record 222 includes information in a tabular form and includes a hotel chain identifier, an enable disable indicator and a program participant identifier shown in row 230. The hotel chain ID indicates an identifier corresponding to a hotel chain. The enable/disable indicator is, e.g., a 1 bit flag, indicating whether sharing of video service information 204 is permitted at a given time with a hotel chain identified by the hotel chain ID. The program participant identifier is, e.g., hotel chain loyalty program membership number that associates the customer (corresponding to the customer profile record 200) to the hotel chain. For example consider the information in row 232, row 232 indicates that video service information sharing is enabled for the hotel chain with hotel chain ID 1 where the customer has been given the program participant number 001234. Consider the information in row 236, row 236 indicates that video service information sharing is disabled for the hotel chain with hotel chain ID N where the customer has been given the program participant number 123456.

In accordance with one aspect of some embodiments when the headend 102 receives a request for video service information regarding customer with program participant Identifier 001234 from hotel chain with Hotel ID 1, the headend 102 verifies if sharing is permitted by the user by checking hotel sharing record 222. After confirming that sharing is permitted, the headend provides at least some of the stored video service information 204 to the hotel system corresponding to hotel ID 1. When such sharing is disabled and not permitted for one or more hotels in accordance with the customer's desire, no video service information is sent to the hotel system. As discussed below, the request for video service information includes information that can be used to identify the hotel sending the request and the customer profile record for which the video service information is sought by the hotel chain.

It should be appreciated that using the video service information 204, the hotel chains can improve the program content viewing and overall browsing experience of a customer staying at the hotel. This is so because using the video service information the hotel can customize the programming content and general settings being provided to the customer in the hotel which are in accordance with the customer's preferred settings for viewing which the customer uses at his/her residence. Thus the customers staying in the hotel feel as if they are browsing and watching program content at home and thus an overall improved viewing experience.

Figure 3:
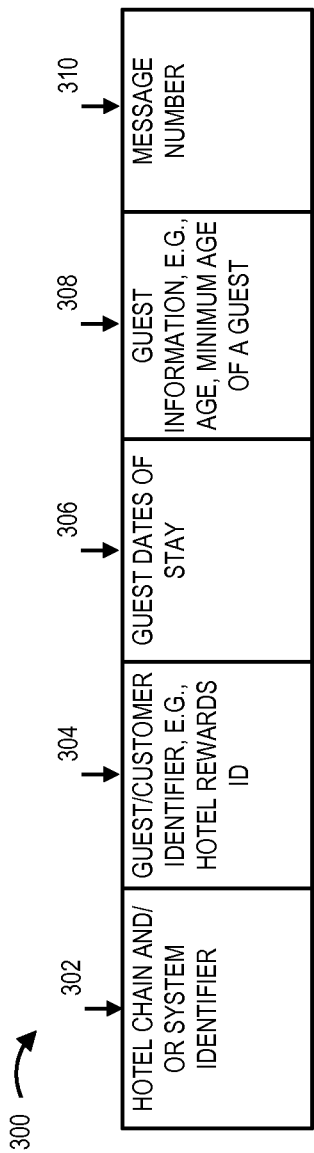
FIG. 3 illustrates an exemplary request for video service information message in accordance with an exemplary embodiment.

FIG. 3 illustrates an exemplary request for video service information message 300 in accordance with some embodiments. The request message 300 includes various information fields including hotel chain and/or system identifier 302, guest/customer identifier field 304, guest dates of stay field 306, guest information 308, and a message number field 310. In various embodiments the request message 300 is sent by a hotel chain seeking video service information corresponding to a customer. The message number field is incremented with the sending of each message. A response to a request message can include the message number obtained from the message number field of the request message allowing a hotel system to easily determine the request message to which a reply message corresponds.

Hotel chain and/or system identifier 302 includes the identifier corresponding to the hotel chain seeking the video service information for a customer. Guest identifier 304 indicates the customer identification information corresponding to the customer for which the video service information is sought. The guest identifier 304 may include, e.g., hotel rewards membership number for the customer, hotel loyalty program membership number, guest name and/or other guest identification information.

Guest dates of stay field 306 indicates the dates and period of stay of the customer. Guest information 308 includes information regarding the age of guest and/or the minimum age of a member who checked into the hotel with the guest, e.g., customers child may be staying with the customer and thus minimum age information can be useful, e.g., for implementing parental controls. Message number field 310 indicates the message number associated with the request message 300.

Figure 4:
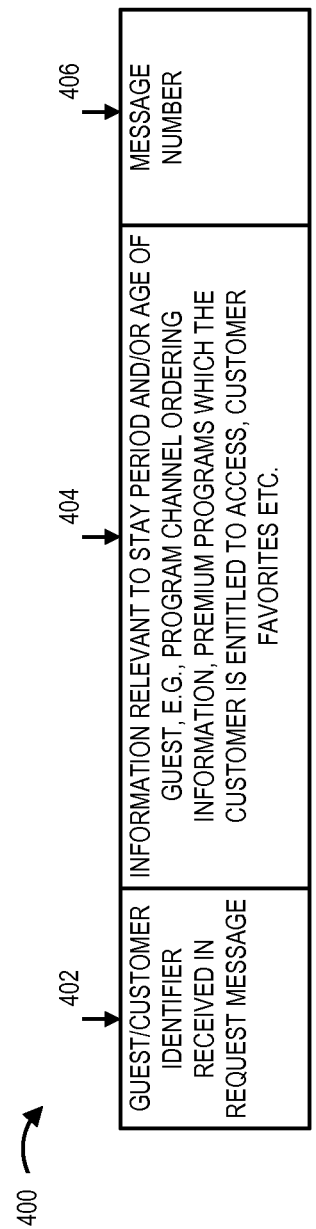
FIG. 4 illustrates an exemplary response message sent in response to the request for video service information message in accordance with an exemplary embodiment.

FIG. 4 illustrates an exemplary reply, e.g., response message 400, sent in response to the request for video service information message 300 in accordance with an exemplary embodiment. The response message 400 may, and in some embodiments is, limited to providing information relevant to the stay, e.g., hotel stay dates and/or guest information, to which the request message refers. For example, parental control information may be omitted if no children are indicated to be present and/or program rights and/or channel ordering information may be limited to the time period of the stay indicated in the request message. In various embodiments the response message 400 is sent by the headend 102 to a hotel chain, e.g., hotel chain 104, in response to the request for service information message 300 from the hotel chain seeking the video service information corresponding to a customer.

Exemplary response message 400 includes a guest/customer identifier field 402, a relevant information field 404 and a message number field 406. Guest/customer identifier 402 indicates the customer identification information corresponding to the customer which was included in the request message field 302 in request message 300. In accordance with one feature of some embodiments, in some embodiments the customer identification information which was included in the request message 300 is included in the identification field 402 of response message 400 and thus no additional customer identification information beyond that which was received from the hotel chain is provided in the response message 400. In this way, in some embodiments, the hotel chain is not provided with information that can be used to identify other customer rewards programs in which the customer participates and the hotel chain is not provided with additional information that could be used to identify a customer on other networks such as the customer's home cable network.

Relevant information 404 includes video service information relevant to stay period and/or the minimum age of the guest, e.g., program channel ordering information, information regarding premium programs which the customer is entitled to access during the dates of customer's stay at the hotel, parental controls if applicable, and other relevant video service information. Information on premium channels and/or pay per view programs the use is entitled to access as a result of the guest's home video service may also, and sometimes is, be included in field 404. This allow a a customer to receive premium programs to which he/she subscribes while staying at the hotel at no charge or at a reduced rate depending on the particular embodiment. Message number field 406 indicates the same message number which was sent in request message field 310 to which the response message corresponds. Using the same message number in the message number field 406 helps in associating a response message, e.g., response 400, to a corresponding request message, e.g., request message 300.

Figures 5, 5A, 5B, 5C:
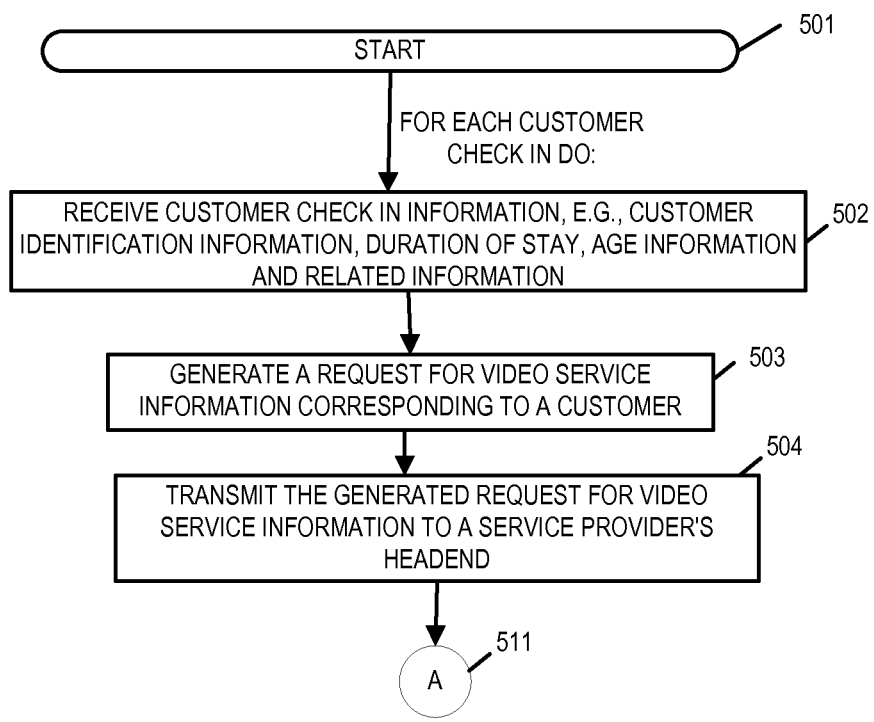
FIG. 5, which comprises a combination of FIGS. 5A, 5B and 5C, illustrates a flowchart of an exemplary method of providing video services, in accordance with an exemplary embodiment of the invention.
Figure 5B:
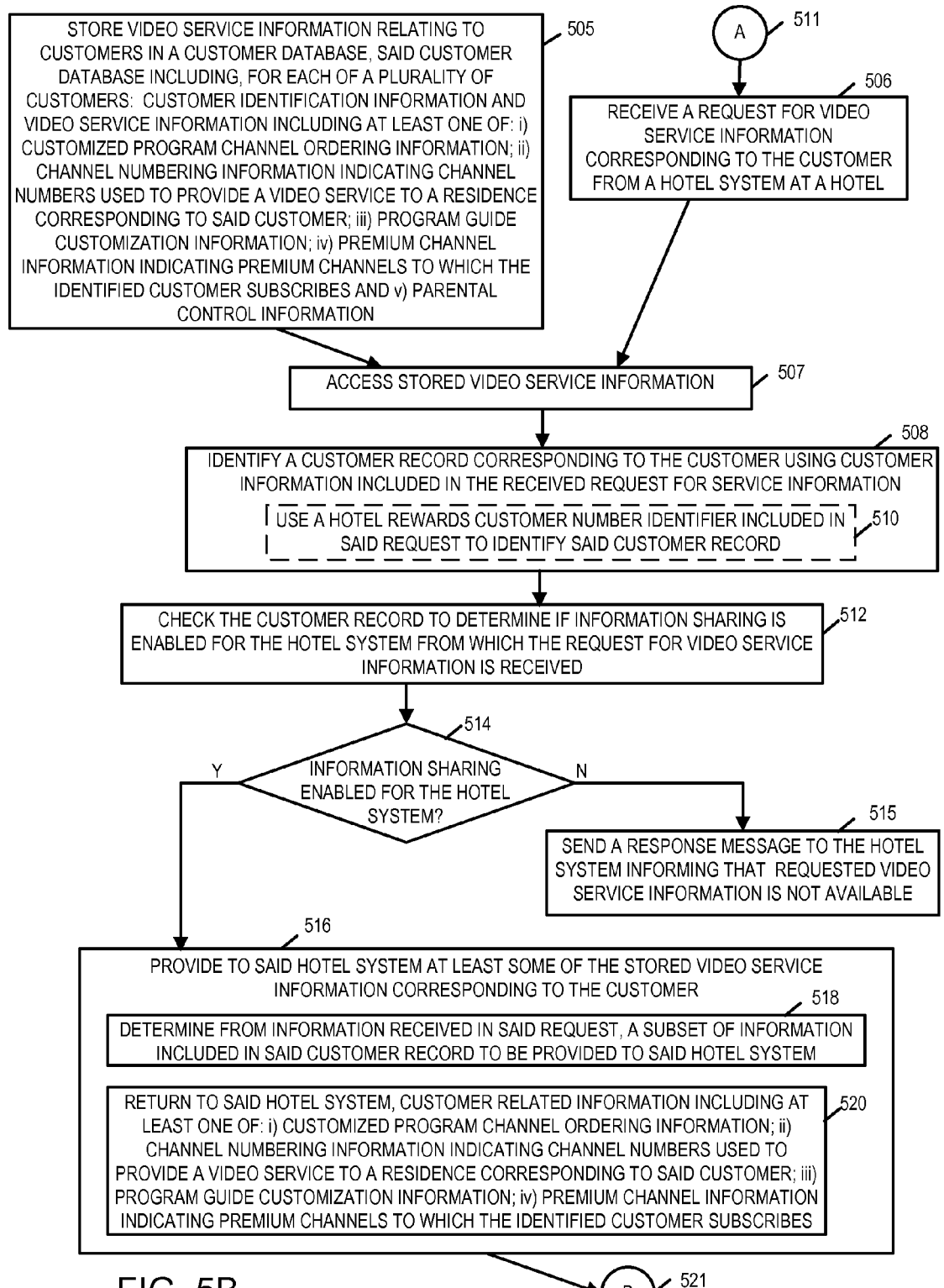
Figure 5C:
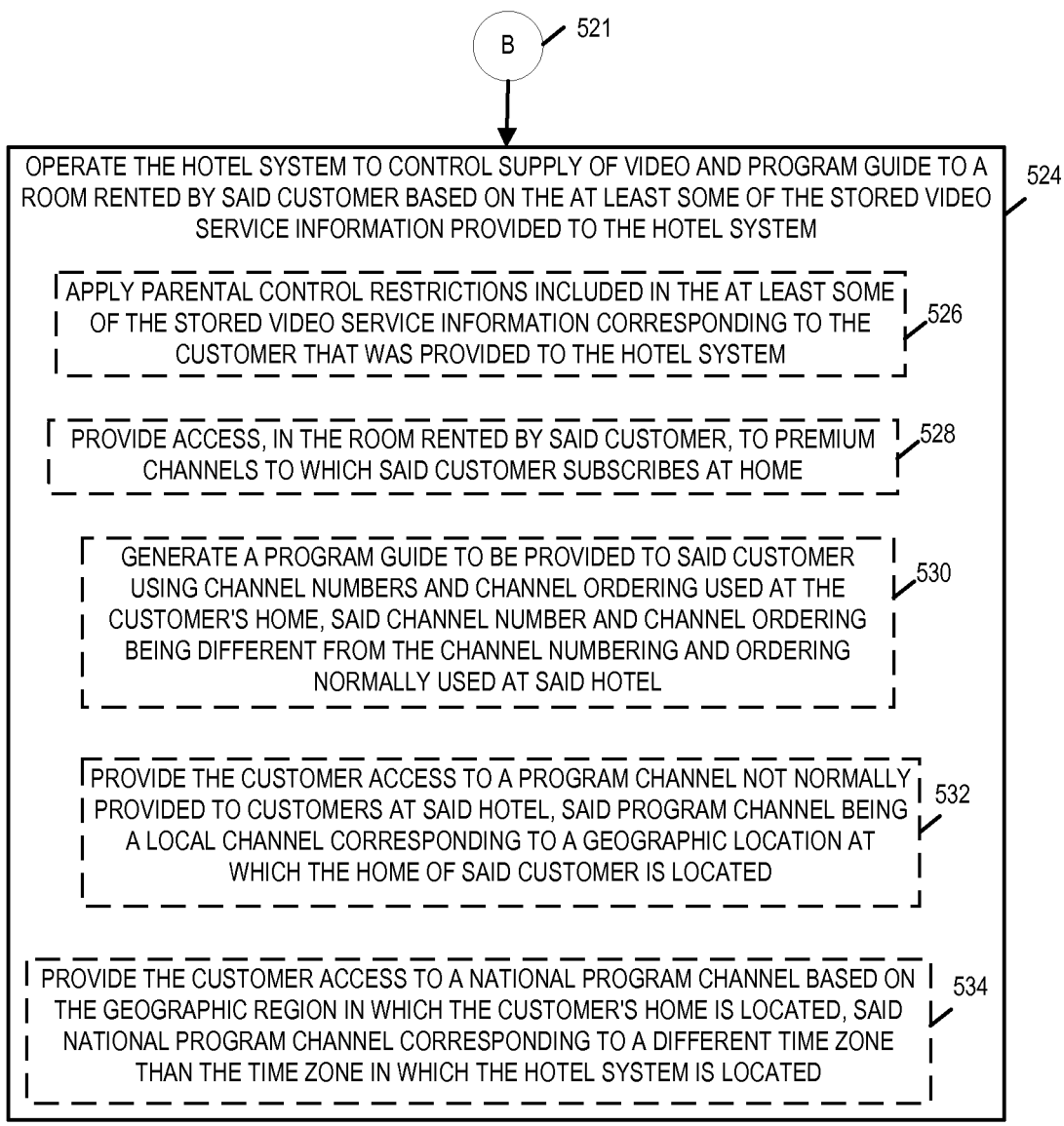

FIG. 5, which comprises a combination of FIGS. 5A, 5B and 5C, illustrates a flowchart 500 of an exemplary method of providing video services, in accordance with an exemplary embodiment of the invention. The exemplary method of flowchart 500 can be implemented by various elements shown in the system 100 of FIG. 1. In some embodiments the steps shown in FIG. 5A and 5C are performed by, e.g., a hotel system, such as hotel system 110. Steps shown in FIG. 5B are performed by, e.g., a service provider's network headend, e.g., headend 102.

The method of flowchart 500 shown in FIG. 5 starts in step 501. Operation proceeds from start step 501 to step 502. In some embodiments, steps discussed with regard to FIG. 5A through 5C are performed, for each customer check in, e.g., each customer check in results in a request for video service information which is then be used to customize the video service provided during the guest's stay. Thus, each time a customer checks in at a hotel, the guest's latest video settings corresponding to the guest's home video service and home channel listing preferences will be accessed and used by the hotel system to provide the guest a customized video experience. In step 502 when a customer checks in, the hotel system receives customer check in information including, e.g., customer identification information, duration of customer's stay at the hotel, guest age information, and/or other hotel guest related information. Operation proceeds from step 502 to step 503 where the hotel system generates a request, for video service information, corresponding to the customer who checked in, in accordance with the invention. The request message may be in the form of message 300 shown in FIG. 3.

Operation proceeds from step 503 to step 504 the hotel system seeking the video service information for the customer transmits the generated request for video service information to the service provider's network headend 102. Operation proceeds from step 504 to 506 via connecting node A 511.

Information storage step 505 may be performed at any time prior to check in at the hotel and generation of a request, e.g., when the guest creates or sets up his home video service account or updates his home video service information including, e.g., parental control setting and/or channel menu preference information. In step 505, video service information relating to a customer or customers is stored in a customer database, e.g., customer database 146. The customer database includes, e.g., for each of a plurality of customers at least one, and in some embodiments all of the following: customer identification information and video service information including at least one, and sometimes all, of: i) customized program channel ordering information; ii) channel numbering information indicating channel numbers used to provide a video service to a residence corresponding to said customer; iii) program guide customization information; iv) premium channel information indicating premium channels to which the identified customer subscribes and v) parental control information. In some embodiments the customer identification information includes at least one of: a customer name, an E-mail address corresponding to the customer, a program participant identifier corresponding to the customer, and a multi-system operator (MSO) customer identifier (e.g., cable customer identifier) used by a multi system operator (e.g., a cable network system operator) to identify the customer. The information in the database relating to a customer may, and in some embodiments is, in the form of a customer profile record, e.g., such as customer record 200 discussed in FIG. 2 example. In some embodiments the program participant identifier is one of a hotel loyalty program member identifier (e.g., frequent guest program identifier) and a hotel rewards customer number identifier. Information stored in step 505 is accessed in step 507.

Returning to step 506. In step 506 a request for video service information corresponding to a customer is received, e.g., at the headend 102, from a hotel system, e.g., hotel system 110. As noted above, the request may be generated at the time of a customer checking into the hotel for a stay and may be transmitted by hotel management server 122 which shares and received response information with the hotel video system 120. For the purposes of discussion, consider that the video service information is requested for the customer corresponding to customer premise 107 who is staying at the hotel chain 1 104, e.g., in customer suit 105. The customer premise 107 and the hotel chain may be located in different geographic regions, e.g., in different states and/or time zones. An exemplary request for video service information message 300 is illustrated in FIG. 3 and has been discussed earlier. In various embodiments the request for service information message includes customer identification information, e.g., such as a program participant identifier associated with the customer. Operation proceeds from step 506 to step 507. In step 507 the stored video service information corresponding to the customers is accessed, so that relevant video service information corresponding to said customer may be selected and returned to the hotel system 110.

Operation proceeds from step 507 to step 508. In step 508 a customer record corresponding to the customer is identified. In some embodiments the headend 102 uses customer identification information included in the received request for video service information to identify the customer record corresponding to the customer for whom the video service information is requested. In some embodiments the request for service message includes a hotel rewards customer number identifier. In some such embodiments the headend 102 uses the hotel rewards customer number identifier to identify the customer record as illustrated in optional step 510. In some embodiments the stored video service information in the customer profile record includes information associating a hotel guest program member identifier to a customer identifier used by a cable company which supplies cable television to a customer premise of the customer identified by the customer identifier.

In some embodiments the headend 102 stores customer identification number associated with the customer, e.g., Name, Email address, account number or other identification information. In addition, the customer is given the option to store other identification information relating to one or more hotels that the customer visits, e.g., such as a hotel program participant identifier, loyalty program membership number, hotel rewards customer number identifier etc., at the headend 102, e.g., through customer's home set top box device. Such identification information, e.g., the hotel program participant identifier, loyalty program membership number, hotel rewards customer number identifier may be, and normally is, generated and given to the guest/customer by the hotel chain's hotel system who can then store it as part of his/her video service profile.

In some embodiments when a request, e.g., request message 300, including a program participant identifier or other identification information is received at the headend 102, the headend compares the received identification information, e.g., program participant identifier, with the stored customer identification information to identify which customer is associated with the program participant identifier received in the request message, and in this manner the customer record corresponding to the customer can be identified. In some embodiments the stored video service information includes information associating a hotel guest program member identifier to a customer identifier used by a cable company which supplies cable television to a customer premise of the customer identified by the customer identifier. For example, multiple different identifiers corresponding to a customer may be stored in the record corresponding to the customer with any one of the identifiers being sufficient to identify the customer and to retrieve the stored information corresponding to the customer from the record in which the identifier is stored.

Operation proceeds from step 508 to step 512. In step 512, the identified customer record is checked to determine if information sharing is enabled/permitted for the hotel system from which the request for video service information is received. As discussed with regard to FIG. 2, the customer profile record, e.g., record 200, includes hotel information sharing record 222 which includes information indicating whether information sharing with a given hotel system is enabled or disabled. In some embodiments a customer can and does enable information sharing on a per hotel chain basis with information sharing being enabled for some hotel chains and not others. In one such embodiment a different information sharing flag, e.g., bit, is associated with each hotel chain with which a user may enable information sharing with the value of the bit associated with the hotel chain identifier being set to "1" to indicate information sharing is enable and "0" to indicate sharing is disabled. For example if flag 1 associated with hotel chain 1 in customer record 1 is set to 1 and flag 2 associated with hotel chain 2 in customer record 1 was set to 0, information sharing would be permitted for the customer corresponding to record 1 with hotel chain 1 but not hotel chain 2.

Operation proceeds from step 512 to step 514. In step 514 it is decided how the operation will proceed if video service information sharing is enabled for the hotel corresponding to the hotel system. If it is determined that if video service information sharing is enabled for the hotel corresponding to the hotel system, the operation proceeds from step 514 to step 516, otherwise operation proceeds from step 514 to step 515. When it is determined that if video service information sharing is enabled for the hotel, in step 515 the headend 102 sends a response message to the hotel system informing that requested video service information is not available for sharing.

Returning to step 516. In step 516 the headend 102 provides, to the hotel system, at least some of the stored video service information corresponding to the customer. In various embodiments performing step 516 includes performing one or both of the steps 518 and 520. In step 518 the headend 102 determines from the information received in the request for video service information, a subset of information included in said customer record to be provided to the hotel system. Thus in some embodiments a subset of video service information is selected and provided to the hotel system in response to the request. The returned information may, and in some embodiments is, limited to information relevant to the guest's stay indicated in the request message.

In step 520 the headend 102 returns to the hotel system, video service related information including at least one, multiple, or all of: i) customized program channel ordering information; ii) channel numbering information indicating channel numbers used to provide a video service to a residence corresponding to said customer; iii) program guide customization information; and iv) premium channel information indicating premium channels to which the identified customer subscribes. As discussed with regard to FIG. 4, the relevant video service information may be provided in a response message, e.g., response message 400. In some embodiments returning to said hotel system video service information includes returning parental control information that is applicable based on guest age information included in the request for service information, but not return parental control information when the age information indicates that it will not be applicable, e.g., because the guest are over the age to which the parental control information would apply. For example in one embodiment if the age indicated in guest field 308 of request message 300 indicates that minimum age of an individual in the room/suite rented by the customer is less than 18 years, e.g., indicating that children under 18 are staying with the guest/customer, then the parental control information is returned to the hotel system, however if the minimum age of an individual in the room/suite rented by the customer is 18 years or more, then parental control information is not returned. In some embodiments returning to said hotel system, at least some of the video service information includes returning premium channel information and/or special event information indicating premium channels and/or special events which the identified customer is allowed to view based on home viewing privileges during said customer's period of stay at the hotel.

Operation proceeds from step 516 to step 524 via the connecting node B 521. In step 524, the hotel system, e.g., the video server 120 of the hotel system 110 which receives the guest video information retrieved by the hotel management server 122, is operated to control the supply of video and program guide to a room, e.g., customer suite 105, rented by the customer based on the at least some of the stored video service information provided to the hotel system. Thus the hotel system provides video services, e.g., programming content, electronic program guide, etc., which are customized based on the at least some of the video service information provided to the hotel system in step 516.

In some embodiments one or more of the steps 526, 528, 530, 532 and 534 are implemented as part of performing step 524. In some embodiments at least one of the steps 526, 528, 530, 532 and 534 is performed as part of step 524, but not necessarily all of the steps 526, 528, 530, 532 and 534.

In step 526 the hotel system applied parental control restrictions included in the at least some of the stored video service information corresponding to the customer that was provided to the hotel system. Thus in some embodiments where step 526 is performed, the hotel system provides video services to the customer/guest staying in the suite rented by the customer after applying parental restrictions included in the at least some of the video service information provided to the hotel system. In some such embodiments the hotel system modifies the electronic program guide provided to the customer staying in the rented room/suite so that some channels, e.g., adult channels, are blocked from display and/or are not listed in the program guide.

In step 528 the hotel system provides access, in the room/suite rented by the customer, to premium channels to which the customer subscribes at home, e.g., at customer premise 107. In some embodiments the at least some of the video service information corresponding to the customer that was provided to the hotel system identifies premium channels which the customer is allowed to access while staying at said hotel at no extra charge, said channels being channels which the customer subscribes to at home. Thus in some embodiments using the features of the present invention the customer is able to enjoy the premium video services, e.g., premium channels, on-demand videos etc., to which the customer subscribes at home while staying at the hotel at no extra charge.

In step 530, the hotel system generates and provides a program guide using channel numbers and channel ordering used at the customer's home, the channel number and channel ordering being different from the channel numbering and ordering normally used at the hotel. Thus it should be appreciated that in some embodiments when the customer the customer staying at the hotel is provided, in the hotel room/suite the electronic program guide/menu customized in such a manner that it appears same or similar to the program guide that is displayed to the customer when he/she is at home.

In step 532, the hotel system provides the customer access to a program channel not normally provided to customers at said hotel, said program channel being a local channel corresponding to a geographic location at which the home of said customer is located. Thus in some embodiments the customer while staying at a hotel in a different geographic locations, the customer is provided access to one or more channels which are specific to the local geographic area on the east coast where customer's home is located even though such one or more local channels are not normally shown in the geographic region where the hotel is located.

In step 534 the hotel system provides the customer access to a national program channel based on the geographic region in which the customer's home is located, said national program channel corresponding to a different time zone than the time zone in which the hotel system is located. For example, consider the customer's home is located on the east coast and the hotel where the customer is staying is located on the west coast. (e.g., provide East Coast CNN channel content rather than west Coast CNN channel content when a person from the east coast stays at a hotel in the west coast.)

Figure 6:
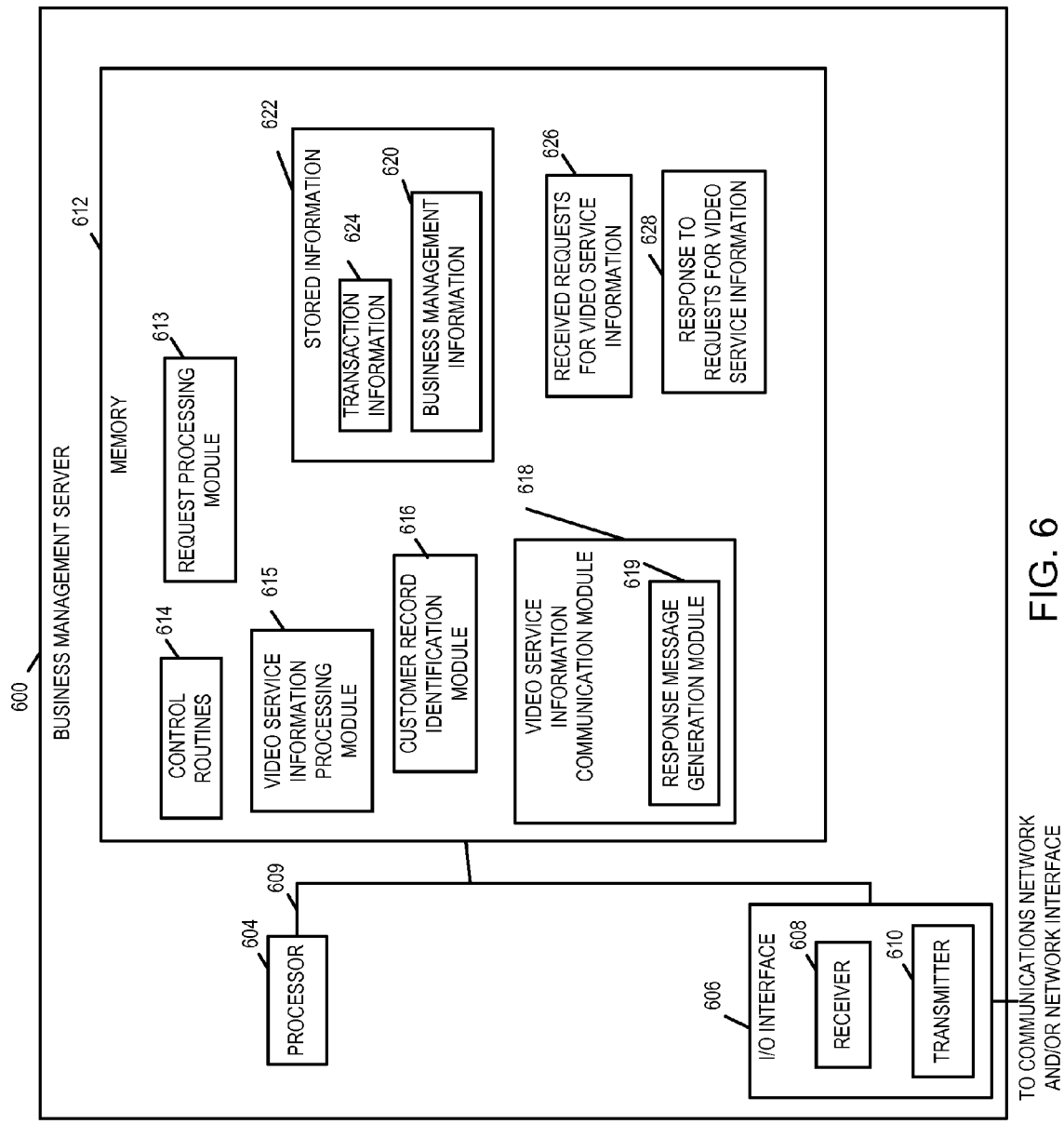
FIG. 6 illustrates an exemplary business management server implemented in accordance with one embodiment of the invention.

FIG. 6 illustrates an exemplary business management (BM) server 600 implemented in accordance with one embodiment of the invention. The exemplary business management server 600 can be used as the BM server 154 illustrated in FIG. 1. As illustrated, the BM server 600 includes a processor 604, an I/O interface 606 including a receiver 608 and a transmitter 610, and a memory 612 coupled together by a bus 609. Via the I/O interface 606 the BM server 600 can receive and/or send information including, e.g., messages, information, commands, signals etc. The I/O interface 606 includes the receiver 608 which is responsible for receiving and processing information, e.g., request for video service information, control signals, etc.

The transmitter module 610 is responsible for generating and sending signals and/or other information. Both the receiver 608 and transmitter 610 may work under direction of the processor 604 which executes one or more of the routines and/or modules included in memory 612.

The memory 1112 includes BM server control routines 614 which control overall BM server operation in accordance with the invention. Control routines 614 may operate in conjunction with various modules which are used to perform various functions. Modules included in the memory 612 include a request processing module 613, a video service information processing module 615, customer record identification module 616, video service information communications module 618, response message generation module 619, stored information 622, received requests for video service information 626, and response to request for video service information 628.

The receiver 608 receives the request for video services information corresponding to a customer from a hotel system at a hotel. The request processing module 613 processes the received request for video services information to analyze and determine what video service information is requested by the hotel system regarding the customer information so that at least some, e.g., a subset, of the video service information corresponding to the customer can be provided to the hotel system.

In some embodiments the control routines 614, when executed by the processor 604, control the business management server 740 to perform various steps discussed with regard to flowchart 500, e.g., one or more of steps 504 through 520.

The video service information processing module 615 selects and processes the video service information to be provided to the hotel system in response to the received request for video service information. The video service information processing module 615 identifies at least some video service information included in the customer profile record, to be provided to the hotel system, based on the received request message, e.g., message 300, e.g., whether parental control information, premium channel information and/or some other relevant information is to be provided or not. The video service information processing module 615 retrieves the identified information from the customer profile record corresponding to the customer.

Customer record identification module 616 is responsible for identifying a customer record corresponding to a hotel guest program identifier and/or other customer identifier included in the received request for video service information. In some embodiments the customer record identification module 616 uses a hotel rewards customer number identifier included in the request for video service information to identify said customer record.

The video service information communications module 618 includes communications routines implementing the communications protocols supported by the BM server 600, to communicate with other servers and/or devices. The communications module 618 receives the at least some video service information corresponding to the customer from the processing module 615 and the response message generation module 619 generates a response message, e.g., message 400, using the at least some video service information corresponding to the customer received from the video service information processing module 615. The communications module 618 then communicates the response message to the hotel system in response to the received request thus providing to the hotel system at least some of the stored video service information corresponding to the customer. In various embodiments the communications module 618 is responsible for returning to said hotel system video service information including at least one of: i) customized program channel ordering information; ii) channel numbering information indicating channel numbers used to provide a video service to a residence corresponding to said customer; iii) program guide customization information; iv) premium channel information indicating premium channels to which the identified customer subscribes. In various embodiments the returning to said hotel system video service information includes returning parental control information if it is applicable based on guest age information included in the request but not if the age information does not indicate that it will be applicable. In various embodiments the returning to said hotel system video service information includes returning to said hotel system video service information includes returning premium channel information and/or special event information indicating premium channels and/or special events which the identified customer is allowed to view based on home viewing privileges during said customer's period of stay at the hotel.

In various embodiments the response generation module 619 is configured to include in the response message, the same customer identifier which was included in the received request for video service information and does not include additional customer identification information beyond that which was received from said hotel system, with the video service information being provided to the hotel system in the response message.

The stored information 622 includes transaction information 624 corresponding to one or more customers, e.g., bill payment transactions, video on-demand and/or pay per view purchase transactions etc., and business management information 620 which includes information regarding service package subscribed by one or more customers at residential premises corresponding to the customers, deals and promotions to be offered to one or more customers, e.g., based on customer's usage and/or viewing habits.

Received requests for video service information 626 includes one or more requests for video service information, e.g., such as request 300, received from one or more hotel systems. Response to requests for video service information 628 includes one or more responses, e.g., such as response 400, generated and sent in response to video service information to one or more hotel systems.

Figure 7:
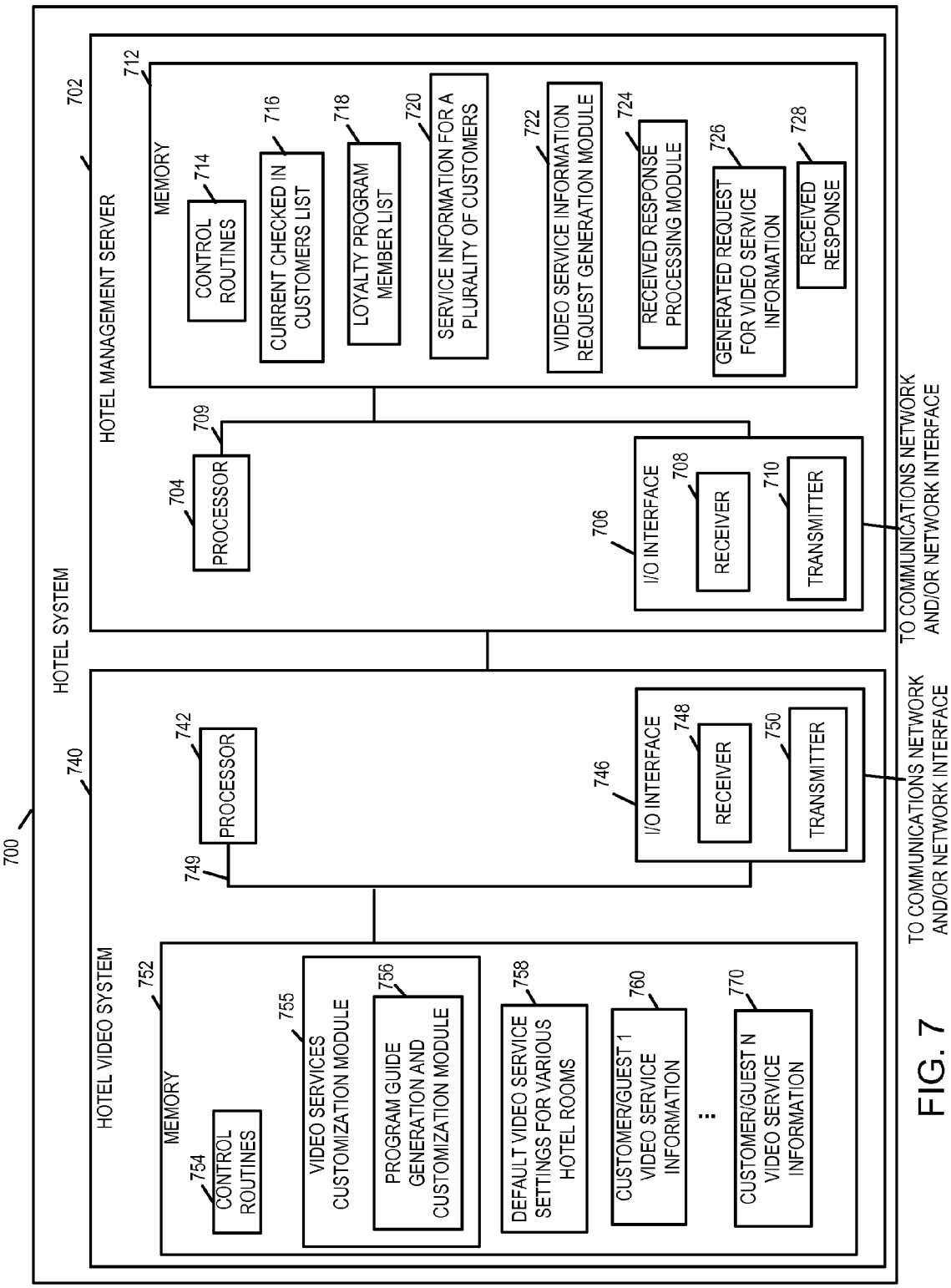
FIG. 7 illustrates an exemplary hotel system implemented in accordance with some embodiment of the invention.

FIG. 7 illustrates an exemplary hotel system 700 implemented in accordance with various exemplary embodiments of the invention. The exemplary hotel system 700 can be used as any one of the hotel systems 110, 128 shown in FIG. 1 and performs the operations discussed with regard to the hotel system. As illustrated, the hotel system 700 includes a hotel management server 702 and a hotel video system 702. The hotel video system 740 and the hotel management server 702 are connected through a local area connection or a high speed network connection.

The hotel management server 702 includes a processor 704, an I/O interface 706 including a receiver 708 and a transmitter 710, and a memory 712 coupled together by a bus 709. Via the I/O interface 706 the hotel management server 700 can receive and/or send information including, e.g., request for video service information message, response messages, commands, signals etc. The I/O interface 706 includes the receiver 708 which is responsible for receiving and processing information, e.g., response to request for video service information.

The transmitter module 710 is responsible for generating and sending signals and/or other information. Both the receiver 708 and transmitter 710 may work under direction of the processor 704 which executes one or more of the routines and/or modules included in memory 712.

The memory 712 includes management server control routines 714 which control overall hotel management server operation in accordance with the invention. Control routines 714 may operate in conjunction with various modules which are used to perform various functions. Modules included in the memory 712 include a video service information request generation module 722, and a received response processing module 724. The memory 712 further includes a list of currently checked in customers 716, loyalty program member list 718, service information for a plurality of customers 720, generated request for video service information which is an output of request generation module 722, and received response 728.

The video service information request generation module generates a request for video service information, e.g., such as request 300, discussed in FIG. 3. The request is sent from the hotel system 700 to the headend 102 as discussed earlier. The received response processing module 724 processes a received response, e.g., such as response 400, to retrieve relevant video service information corresponding to one or more customers/guests for which the video service information is requested. The retrieved relevant information is, e.g., the relevant video service information included in a received response message.

Currently checked in customer list 716 includes information regarding customers who are currently staying in the hotel and includes, in some embodiments, customer identification information, age information, period of stay in the hotel, etc. Loyalty/Rewards program member list 718 includes information regarding privileged customers who are members of the hotel's rewards program and may be entitled to receive services (video services and other hotel services) not available to some other regular customers. Service information 720 includes information regarding services available to the customers who are members of the hotel's loyalty/rewards programs and information regarding services available to other regular customers.

The hotel video system 740 includes a processor 742, an I/O interface 746 including a receiver 748 and a transmitter 750, and a memory 752 coupled together by a bus 749. Via the I/O interface 746 the hotel video system 700 can receive and/or send information including, e.g., multi media content (video, audio etc.), commands, signals, and other information. The I/O interface 746 includes the receiver 748 which is responsible for receiving and processing information, e.g., video content from the headend 102, customer related video service information from the hotel management server 702.

The transmitter 750 is responsible for generating and sending signals and/or other information. For example, via the transmitter 750 the hotel video system 740 sends programming content and/or other information to various customer suits/rooms in the hotel. The hotel system 700 may provide programming content and/or other information to the devices (e.g., set top box and/or TV sets) in various customer suits/rooms through wired or wireless links.

Both the receiver 748 and transmitter 750 may work under direction of the processor 742 which executes one or more of the control routines and/or modules included in memory 752. The control routines 754 when executed by the processor 742 control the video system or the elements therein to perform various operations in accordance with the invention. For example, the control routines 754 when executed control the hotel video system 740 to control the supply of video and program guide, e.g., a customized program guide, to a room rented by a customer based on the at least some of the video service information corresponding to that customer, that was provided to the hotel video system 740.

The memory 752 includes video system control routines 754 which control overall hotel video system operation in accordance with the invention. Control routines 754 may operate in conjunction with various modules which are used to perform various functions. The memory 752 includes a video service customization module 755, information regarding default video service settings for various hotel rooms 756, and video service information regarding a plurality of customers for which video service information was requested from the headend 102 including customer 1 video service information 760 through customer N video service information 770.

The video services customization module 755 customizes the video services, e.g., video content, ordering of program channels, etc., to be provided to a customer in a customer suit/room based on the customer video service information corresponding to that particular customer/guest, e.g., such as customer/guest 1 video service information provided to the hotel video system 740 by the hotel management server 702. The hotel management server 702 in turn receives the video service information corresponding to the customer in a response message, e.g., response message 400, from the headend 102. The video services customization module 755 includes program guide generation and customization module 756 which generates an electronic program guide in accordance with the received video service information corresponding to the customer. Thus the program guide generation and customization module 756 provides a program guide which is customized according to customer's home viewing preferences. In some embodiments the program guide generation and customization module 756 generates a program guide using channel numbers and channel ordering used at the customer's home, said channel number and channel ordering being different from the channel numbering and ordering normally used at said hotel.

In some embodiments the video services customization module 755 controls the hotel video system 740 to supply video and program guide to a room rented by the customer based on the at least some of the stored video service information that was provided to the hotel system 700 from the headend 102. In some embodiments the video services customization module 755 controls the hotel video system 700 to apply parental control restrictions included in the at least some of the stored video service information corresponding to the customer that was provided to the hotel system. In some embodiments the video services customization module 755 controls the hotel video system 700 to provide access, in the room rented by a customer in the hotel, to premium channels to which the customer subscribes at home.

Thus in some embodiments customer's settings regarding one or more of: the ordering of program channels, channel numbering, parental controls, available premium channels, etc., are applied and thus customized video services are provided to the customer's suite/room in the hotel.

In some embodiments the at least some of the stored video service information corresponding to the customer that was provided to the hotel system 700 identifies premium channels which the customer is allowed to access while staying at the hotel at no extra charge, said channels being channels which the customer subscribes to at home.

In some embodiments the control routines 754, when executed by the processor 742, control the hotel video system 740 to perform various steps discussed with regard to flowchart 500, e.g., one or more of steps 524, 526, 528, 530, 532, and 534. Thus in some embodiments the control routines 754, when executed by the processor 742, control the hotel video system 740 to provide the customer access to a program channel not normally provided to customers at said hotel, said program channel being a local channel corresponding to a geographic location at which the home of said customer is located.

In some embodiments the control routines 754, when executed by the processor 742, control the hotel video system 740 to provide the customer access to a national program channel based on the geographic region in which the customer's home is located, said national program channel corresponding to a different time zone than the time zone in which the hotel system is located. For example, East Coast CNN channel content is provided rather than west Coast CNN channel content, when a person from the east coast stays at a hotel in the west coast.

In various embodiments system elements described herein are implemented using one or more modules which are used to perform the steps corresponding to one or more methods of the present invention, for example, storing information; receiving a request for video service information; and providing at least some video service information, in response to the request for video service information. In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of providing video services, the method comprising:
    storing video service information relating to customers in a customer database located at a service provider site, said customer database including, for each of a plurality of customers of said service provider: customer identification information and video service information including at least one of: i) customized program channel ordering information; ii) channel numbering information indicating channel numbers used to provide a video service to a residence corresponding to said customer; iii) program guide customization information; or iv) parental control information;
    receiving, at said service provider site, a request for video service information corresponding to a customer from a hotel system at a hotel including a guest room corresponding to said customer; and
    providing to said hotel system at least some of the stored video service information corresponding to said customer, said provided stored video service information including information on premium channels the customer is entitled to access as a result of the customer's home video service and information indicating whether pay to view content is to be automatically disabled when the customer checks in with children; and
    operating said hotel system to automatically disable or enable pay per view based on check in information and the received information indicating whether video on-demand is to be automatically disabled when the customer checks in with children.

2. The method of claim 1,
    wherein said program participant identifier is a loyalty customized identification information includes; and
    wherein the information provided to the hotel in response to said request includes no customer identification information beyond that which was received from the hotel system.

3. The method of claim 1, wherein the video service information stored in said database further includes for said customer:

a hotel information sharing record including information indicating multiple hotel chains and including information corresponding to a first hotel chain indicating whether the customer has enabled information sharing with hotels in the first hotel chain and information corresponding to a second hotel chain indicating whether the customer has enabled information sharing with hotels in the second hotel chain; and wherein providing to said hotel system at least some of the stored video service information corresponding to said customer is performed after determining that said hotel information sharing record includes information indicating that the customer has enabled information sharing with said hotel.

4. The method of claim 3, wherein the request further includes the dates at which a hotel room is to be occupied by the customer; and wherein information on premium channels which the customer is entitled to access is limited to the time period indicated by the dates which the hotel room is to be occupied by the customer.

5. The method of claim 3, wherein said hotel information sharing record indicates that the customer has enabled information sharing with hotels in the first hotel chain and disabled information sharing with hotels in the second hotel chain.

6. The method of claim 1, wherein said service provider site is an office of said service provider; and wherein said customer database includes a customer record corresponding to said customer, said customer record including hotel chain identifiers and information indicating whether information sharing is enabled or disabled on a per hotel chain basis for each hotel chain identified by hotel chain identifier stored in said customer record.

7. The method of claim 6, wherein said stored video service information includes information associating a hotel guest program member identifier to a customer identifier used by a cable company which supplies cable television to a customer premise of the customer identified by the customer identifier.

8. The method of claim 7, wherein providing to said hotel system at least some of the stored video service information includes:

identifying a customer record corresponding to the hotel guest program member identifier; and returning to said hotel system video service information including at least one of: i) customized program channel ordering information; ii) channel numbering information indicating channel numbers used to provide a video service to a residence corresponding to said customer; iii) program guide customization information; or iv) premium channel information indicating premium channels to which the identified customer subscribes.

9. The method of claim 8, wherein identifying a customer record includes:

using a hotel rewards customer number identifier included in the request to identify said customer record.

10. The method of claim 9, wherein said video service information is provided to said hotel system with the same customer identifier which was included in said request and without providing additional customer identification information beyond that which was received from said hotel system.

11. The method of claim 6, wherein said customer record indicates that the customer has enabled information sharing with hotels in a first hotel chain and disabled information sharing with hotels in a second hotel chain.

12. The method of claim 1, wherein video service information stored in the customer database includes information for the customer, that was configured from the customer's home, indicating that video-on-demand is to be automatically disabled when the customer checks in at the hotel with children.

13. A method of providing video services, the method comprising:

storing video service information relating to customers in a customer database located at a service provider site, said customer database including, for each of a plurality of customers of said service provider: customer identification information and video service information including at least premium channel information indicating premium channels to which the identified customer subscribes and one of: i) customized program channel ordering information; ii) channel numbering information indicating channel numbers used to provide a video service to a residence corresponding to said customer; iii) program guide customization information; or iv) parental control information;

receiving, at said service provider site, a request for video service information corresponding to a customer from a hotel system at a hotel including a guest room corresponding to said customer, said request for video service information indicating whether a child checked into the hotel with the customer or information indicating an age of the customer;

providing to said hotel system at least some of the stored video service information corresponding to said customer, said provided stored video service information including information on premium channels the customer is entitled to access as a result of the customer's home video service;

operating said hotel system to allow a customer to access premium channels the customer is entitled to access as a result of the customer's home video service while staying at the hotel at no charge or a reduced charge; and wherein providing to said hotel system at least some of the stored video service information corresponding to said customer includes limiting the provided information to information relevant to a stay at said hotel, said providing to said hotel system at least some of the stored video service information including omitting, from the provided information, parental control information when no children are indicated to be present with the customer.

14. An apparatus for use in a hotel system in a hotel for providing video services, comprising:

an interface for sending a request to a service provider system for video service information corresponding to a customer stored at a service provider site, said video service information including premium channel information indicating premium channels to which the identified customer subscribes and at least one of: i) customized program channel ordering information; ii) channel numbering information indicating channel numbers used to provide a video service to a residence corresponding to said customer; iii) program guide customization information; or iv) parental control information; and a receiver included in said interface, for receiving at said hotel system, at least some of the stored video service information corresponding to said customer, said received stored video service information including information on premium channels the customer is entitled to access as a result of the customer's home video service and information indicating whether pay to view content is to be automatically disabled when the customer checks in with children; and a hotel video system configured to automatically disable or enable pay per view based on check in information and the received information indicating whether pay to view content is to be automatically disabled when the customer checks in with children.

15. The apparatus of claim 14, further comprising:

a processor configured to control said apparatus to control the supply of video and program guide to a room rented by the customer in said hotel based on the at least some of the stored video service information that was provided to the hotel system.

16. The apparatus of claim 15, wherein said processor is further configured to apply, as part of controlling the supply of video and program guide, parental control restrictions included in the at least some of the stored video service information corresponding to the customer that was provided to the hotel system.

17. The apparatus of claim 15, wherein said processor is further configured to provide access, in the room rented by said customer, to premium channels to which said customer subscribes at home.

18. An apparatus for providing video services, comprising:

a customer database located at a service provider site for storing video service information relating to customers, said customer database including, for each of a plurality of customers of said service provider: customer identification information and video service information including at least premium channel information indicating premium channels to which the identified customer subscribes and one of: i) customized program channel ordering information; ii) channel numbering information indicating channel numbers used to provide a video service to a residence corresponding to said customer; iii) program guide customization information; or iv) parental control information;

a receiver for receiving a request for video service information corresponding to a customer from a hotel system at a hotel including a guest room corresponding to said customer; and an interface for providing to said hotel system at least some of the stored video service information corresponding to said customer, said provided stored video service information including information on premium channels the customer is entitled to access as a result of the customer's home video service; and a hotel video system configured to automatically disable or enable pay per view based on check in information and received information indicating whether pay to view content is to be automatically disabled when the customer checks in with children and to allow a customer to access premium channels the customer is entitled to access as a result of the customer's home video service while staying at the hotel at no charge or a reduced charge.

19. The apparatus of claim 18, wherein said customer identification information includes: at least one of: a customer name, an E-mail address corresponding to the customer, a program participant identifier corresponding to the customer, or a multi-system operator customer identifier used by a multi system operator to identify the customer.

20. The apparatus of claim 18, wherein the video service information stored in said database further includes:

parental control information indicating which channels are to be blocked from display or listing on a program guide.

\* \* \* \* \*